(12) United States Patent
Gohara et al.

(10) Patent No.: US 6,456,047 B1
(45) Date of Patent: Sep. 24, 2002

(54) METHOD OF CHARGING SLIDE DOOR-CONTAINED BATTERY

(75) Inventors: Takashi Gohara; Kazuyoshi Ogasawara, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/987,321

(22) Filed: Nov. 14, 2001

(30) Foreign Application Priority Data

Nov. 16, 2000 (JP) ........................................ 2000-349508

(51) Int. Cl.[7] ................................................. H02J 7/16
(52) U.S. Cl. ........................................ 320/162; 320/104
(58) Field of Search ............................... 320/162, 104, 320/137, 103; 307/46, 9.1, 11, 43

(56) References Cited

U.S. PATENT DOCUMENTS 3,868,558 A * 2/1975 Winkley et al. ............... 322/28
5,140,316 A 8/1992 DeLand et al. ......... 340/825.69
6,089,649 A * 7/2000 Hamada et al. ............. 296/155

FOREIGN PATENT DOCUMENTS

JP 10-278588 10/1998 .............. B60J/5/06

OTHER PUBLICATIONS

Japanese Abstract No. 2001152745, dated Nov. 26, 1999.
Japanese Abstract No. 11294010, dated Apr. 14, 1998.

* cited by examiner

Primary Examiner—Edward H. Tso
Assistant Examiner—Lawrence Luk
(74) Attorney, Agent, or Firm—Sughrue Mion, PLLC

(57) ABSTRACT

Loads (53) in a slide door are in a stopped condition, and the charging rate of a slide door-contained battery (38) is below a predetermined value, the slide door-contained battery (38) is charged. When the charging rate of the slide door-contained battery (38) is above the predetermined value, the trickle charging is effected.

5 Claims, 6 Drawing Sheets

METHOD OF CHARGING SLIDE DOOR-CONTAINED BATTERY

BACKGROUND OF THE INVENTION

This invention relates to a slide door-contained battery-charging method for charging a slide door-contained battery with electric power supplied from a vehicle body of to a slide door of a vehicle.

In recent years, automobiles having a slide door slidably mounted thereon have had a high-function design. With this high-function design, for example, a power window has been mounted on the slide door, and it has become necessary to supply electric power to the slide door so as to drive the power window. Therefore, in recent years, there have been proposed various vehicle slide door power supply apparatuses for supplying electric power from a vehicle body to a vehicle slide door of a vehicle. One example of such vehicle slide door power supply apparatuses will be described briefly.

In FIG. 7, a body-side feed contact 4 is mounted on a vehicle body 1. When a slide door 2 is closed, this feed contact 4 is brought into contact with a door-side feed contact 3 mounted on the slide door 2, for an electrical connection thereto. The body-side feed contact 4 is connected to a battery 5 mounted on the vehicle body 1. A door-inside controller 6 is mounted in the slide door 6. The door-inside controller 6 includes a slide door-contained battery 7 which is chargeable, and the door-side feed contact 3 is connected to this slide door-contained battery 7. When the slide door 2 is opened so that the door-side feed contact 3 is out of contact with the body-side feed contact 4, the slide door-contained battery 7 supplies electric power to a pressure sensor 8 and a pressure-sensitive switch 9 which are mounted on the slide door 2.

FIG. 8A is a schematic view of the body-side feed contact 4. FIG. 8B is a schematic view of the door-side feed contact 3. In FIG. 8A, reference numeral 10 denotes female terminals (female connector). In FIG. 8B, reference numeral 11 denotes male terminals (male connector) which contact the female terminals 10 for the electrical connection thereto when the slide door 2 (see FIG. 7) is closed.

In the above related art, during the time when the door-side feed contact 3 and the body-side feed contact 4 is kept in contact with each other, the slide door-contained battery 7 is always being charged. Therefore, this is not an efficient charging method, and besides this shortened the lifetime of the slide door-contained battery 7. On the other hand, even when the slide door-contained battery 7 is in a fully-charged condition, the supply of electric power to the slide door 2 continues, and this burdens the battery 5 mounted on the vehicle body 1.

SUMMARY OF THE INVENTION

This invention has been made under the above circumstances, and an object of the invention is to provide a slide door-contained battery-charging method in which the efficient charging is effected, and the burden on a battery on a vehicle body is reduced.

According to a first aspect of the present invention, which is made in order to solve the above problems, there is provided a slide door-contained battery-charging method for charging a slide door-contained battery, mounted in a slide door, with electric power supplied from a vehicle body of a vehicle to the slide door slidably mounted on the vehicle body; characterized in that when a load in the slide door is in a stopped condition, and a charging rate of the slide door-contained battery is below a predetermined value, the slide door-contained battery is charged with the electric power.

In the slide door-contained battery-charging method of a second aspect of the invention, trickle charging is effected when the charging rate of the slide door-contained battery is above the predetermined value.

In the slide door-contained battery-charging method of a third aspect of the invention, the electric power is supplied from the vehicle body to the slide door by a mutual induction operation of a primary coil, provided at the vehicle body, and a secondary coil provided at the slide door.

In the first aspect, there is adopted the charging method in which when the load in the slide door is in a stopped condition, and the charging rate of the slide door-contained battery is below the predetermined value, the slide door-contained battery is charged with the electric power.

In the second aspect, the trickle charging is effected when the charging rate of the slide door-contained battery is above the predetermined value.

In the third aspect, the electric power is supplied from the vehicle body to the slide door by the mutual induction operation of the primary coil, provided at the vehicle body, and the secondary coil provided at the slide door.

DETAILED DESCRIPTION OF THE PREFERRED EMBODIMENTS

One preferred embodiment of the present invention will now be described with reference to the drawings.

Figure 1:
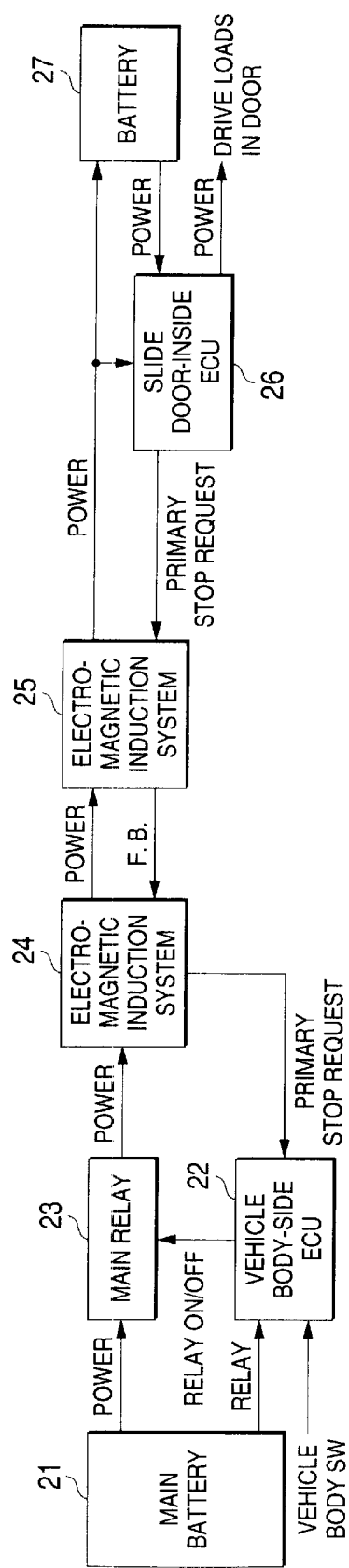
FIG. 1 is a block diagram showing the construction of a vehicle slide door power supply apparatus for the purpose of explaining a slide door-contained battery-charging method of the invention.
Figure 2:
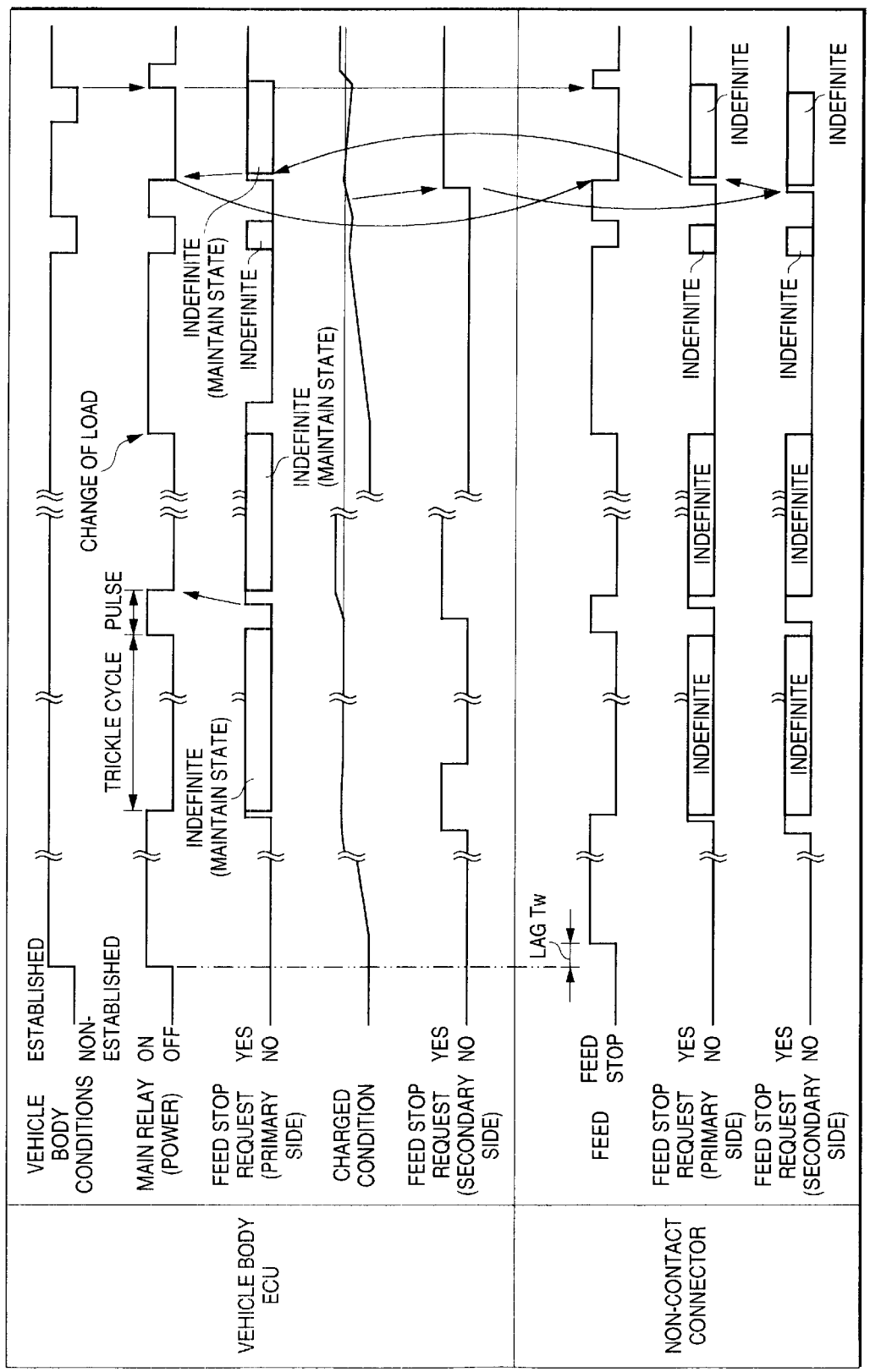
FIG. 2 is an electromagnetic induction operation logic corresponding to FIG. 1.

FIG. 1 is a block diagram showing the construction of a vehicle slide door power supply apparatus for the purpose of explaining a slide door-contained battery-charging method of the invention. FIG. 2 is an electromagnetic induction operation logic corresponding to FIG. 1.

Before explaining the slide door-contained battery-charging method of the invention, the construction of the vehicle slide door power supply apparatus will first be described with reference to FIG. 1.

In FIG. 1, the vehicle slide door power supply apparatus for supplying electric power to a slide door, slidably mounted on a vehicle body of a vehicle, includes a main battery 21, a vehicle body-side ECU 22, a main relay 23, and an electromagnetic induction system 24, which are mounted on the vehicle body, and this apparatus further includes an electromagnetic induction system 25, a slide door-inside ECU 26, and a battery 27 (corresponding to a slide door-contained battery recited in the Claims), which are mounted on the slide door.

In the above construction, the main battery 21 is designed to supply electric power to the vehicle body-side ECU 22 and the main relay 23. The vehicle body-side ECU 22 controls various equipments and so on, mounted on the vehicle body, and can turn on/off the main relay 23. A plurality of vehicle body switches SW are connected to the vehicle body-side ECU 22. By operating one of those vehicle body switches SW which correspond to the slide door, corresponding loads in the slide door can be driven. The electromagnetic induction system 24 comprises at least a primary feed-purpose non-contact connector, a primary feedback-signal-purpose non-contact connector, and a primary feedback control circuit.

On the other hand, the slide door-side electromagnetic induction system 25 is similar to the vehicle body-side electromagnetic induction system 24, and comprises a secondary feed-purpose non-contact connector, a secondary feedback-signal-purpose non-contact connector, and a secondary feedback control circuit. The electromagnetic induction system 25 is designed to supply electric power to the slide door-inside ECU 26 and the battery 27 to charge the battery 27 with electricity. A plurality of loads in the slide door are connected to the slide door-inside ECU 26, and this ECU is designed to drive these loads. When electric power (for driving the loads) is supplied from the battery 27 to the slide door-inside ECU 26, the electromagnetic induction system 25 serves as an electric charger for the battery 27, and therefore a compact design is achieved.

Next, the operation of the above construction, as well as the slide door-contained battery-charging method of the invention, will be described with reference to FIGS. 1 and 2.

(1) When vehicle body conditions (The main battery is in an engine-operating condition, and the slide door is in a closed condition) are established, the main relay 23 is turned on by the vehicle body-side ECU 22, and electric power is supplied to the vehicle body-side electromagnetic induction system 24. At this time, electric power is supplied to the primary feed-purpose non-contact connector via the main relay 23.

(2) The vehicle body-side electromagnetic induction system 24, thus supplied with electric power, supplies electric power to the slide door-side electromagnetic induction system 25 by a mutual induction operation. An electromotive force is produced in the electromagnetic induction system 25, and this electromotive force is supplied (charged) to the slide door-inside ECU 26 and the battery 27. When the main relay 23 is turned on, electric power is always supplied to the slide door. The charging of the battery 27 is effected when the loads in the slide door are in a stopped condition.

(3) The slide door-inside ECU 26 controls the battery 27 and the plurality of loads in the slide door. Then, when the charging rate of the battery 27 exceeds a predetermined value, the slide door-inside ECU 26 outputs a feed stop request to the secondary (feedback-signal-purpose) non-contact connector.

(4) The feed stop request from the secondary non-contact connector is transmitted to the primary (feedback-signal-purpose) non-contact connector by the feedback signal (see F.B in the drawings). A lag at this time, which is shown in FIG. 2, is defined by Tw (A trickle cycle and a pulse width are selected, using Tw as a reference).

(5) The primary feedback control circuit refers the feedback signal in order to adjust the voltage and outputs the feedback signal to the exterior via a buffer. The vehicle body-side ECU 22, monitoring the feedback signal, inputs the feedback signal thereinto as a feed stop signal. When there is a feed stop request, this ECU 22 turns off the main relay 23, thereby stopping the supply of electric power from the main battery 21 to the vehicle body-side electromagnetic induction system 24. When there is no feed stop request, the supply of electric power is continued.

(6) When the supply of electric power from the main battery 21 to the vehicle body-side electromagnetic induction system 24 is kept stopped by the feed stop request, the vehicle body-side ECU 22 effects the trickle charging (trickle charge, pulse charge) corresponding to the self-discharge and dark current of the battery 27. This operation is not influenced whether or not there is the feed stop request.

(7) When the vehicle body conditions are changed to be established, the trickle charging (trickle charge, pulse charge) is effected unconditionally. At this time, if it is judged by the slide door-inside ECU 26 that the charging rate of the battery 27 is above the predetermined value, the trickling operation is effected, and if not, the ordinary charging is effected. This is the same even after the loads are operated.

The feed stop function of the non-contact connectors will be additionally described.

(1) During the time when electric power is supplied to the primary feed-purpose non-contact connector, electric power is supplied to the secondary feed-purpose non-contact connector.

(2) During the time when electric power is supplied to the secondary feed-purpose non-contact connector, the power supply stop signal, superimposed on the voltage-adjusting feedback signal, is outputted from the secondary feedback-signal-purpose non-contact connector to the primary feedback-signal-purpose non-contact connector.

This is not effected when electric power can not be supplied to the secondary feed-purpose non-contact connector.

(4) The actual feed stop and recovery are effected by supplying and interrupting the electric power of the main battery in accordance with the power stop signal and vehicle-body conditions.

From the foregoing description, it will be readily appreciated that the efficient charging of the battery 27 can be effected. It will also be readily appreciated that the burden on the main battery 21 is reduced. Therefore, there is achieved an advantage that there is provided the charging method which overcomes the problems of the prior art.

Figure 3:
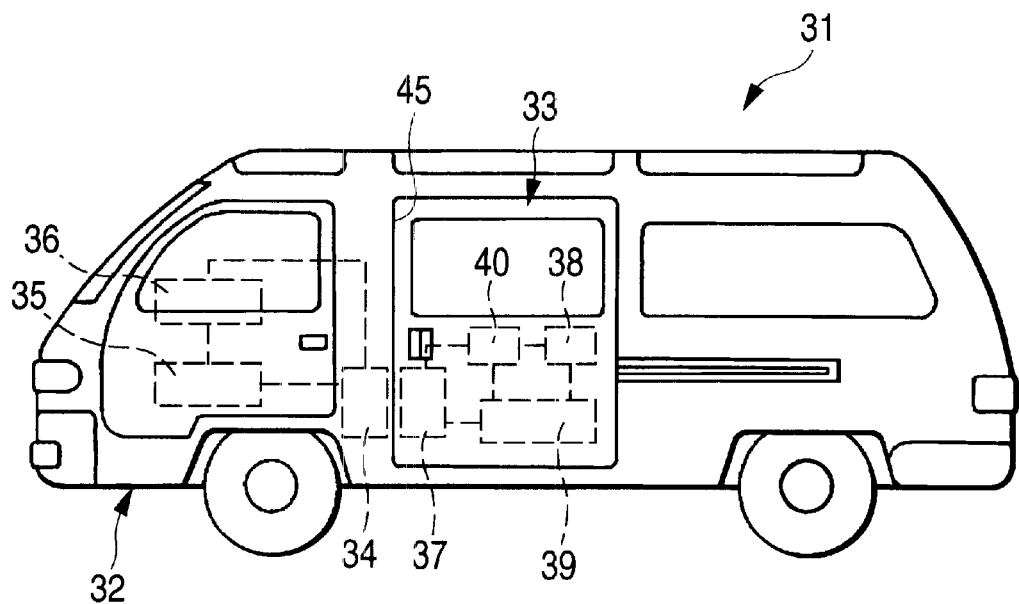
FIG. 3 is a construction view showing one example of a vehicle slide door power supply apparatus (in a closed condition of a slide door).
Figure 4:
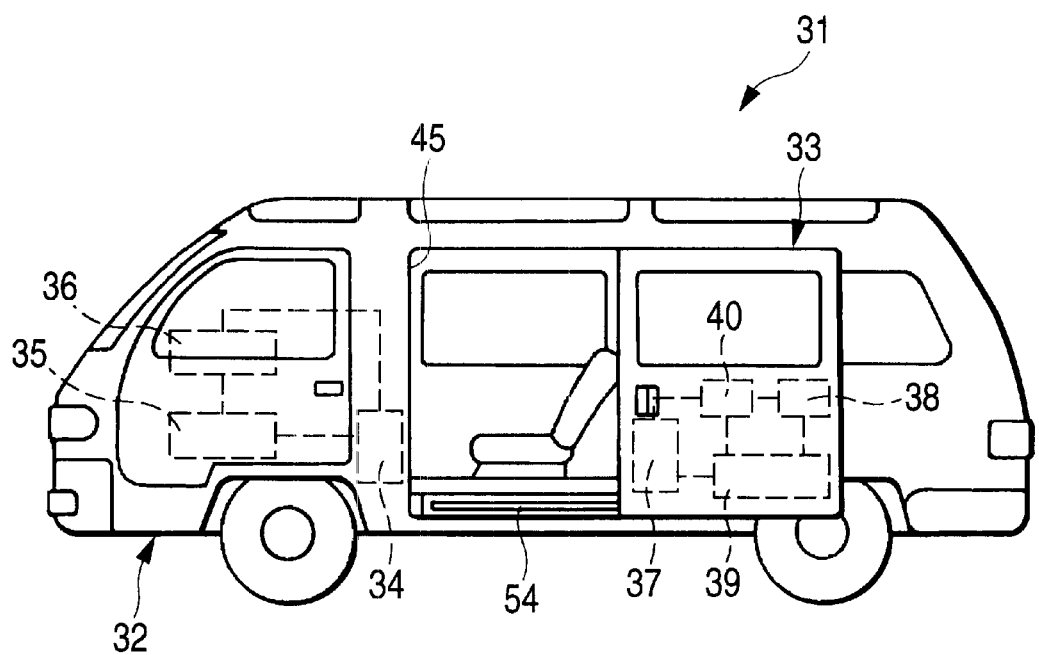
FIG. 4 is a construction view showing one example of the vehicle slide door power supply apparatus (in an open condition of the slide door).
Figure 5:
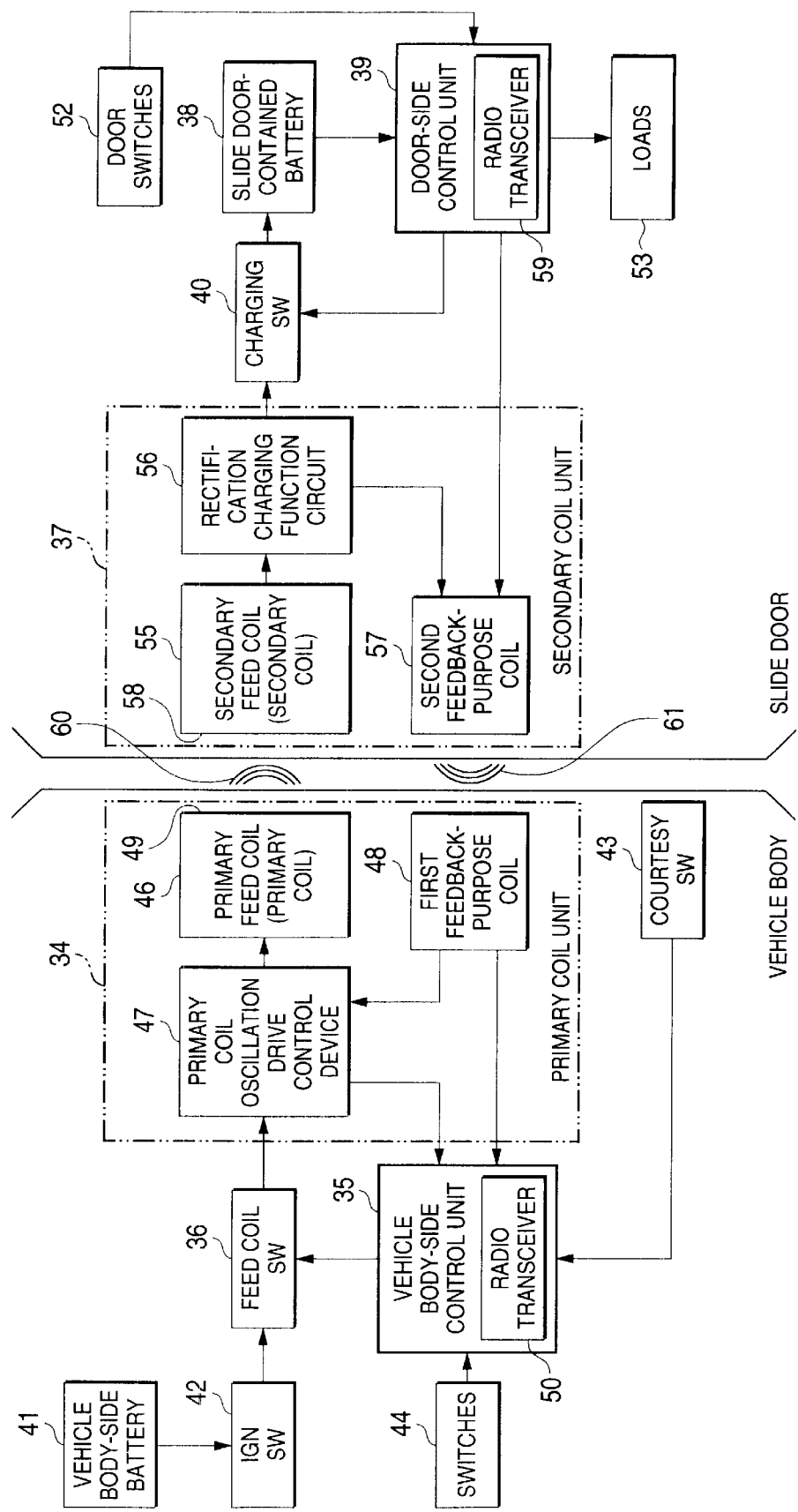
FIG. 5 is a block diagram showing the construction of the vehicle slide door power supply apparatus (corresponding to that of FIG. 3) for the purpose of explaining a slide door-contained battery-charging method of the invention.

The construction of the above vehicle slide door power supply apparatus will be described a little more specifically with reference to FIGS. 3 to 5. A slide door 33 is mounted on a vehicle body 32 of a vehicle 31 so as to slide in a forward-rearward direction of the vehicle body 32. A primary coil unit 34, a vehicle body-side control unit 35, a feed control switch (SW) 36 and so on are provided on the vehicle body 32. A secondary coil unit 37, a slide door-contained battery 38, a door-side control unit 39, a charging switch(SW) 40 and so on are provided on the slide door 33.

The primary coil unit 34 corresponds to the above-mentioned vehicle body-side electromagnetic induction system 24, the vehicle body-side control unit 35 to the above-mentioned vehicle body-side ECU 22, the feed control switch (SW) 36 to the above-mentioned main relay 23, the secondary coil unit 37 to the above-mentioned slide door-side electromagnetic induction system 25, the slide door-contained battery 38 to the above-mentioned battery 27. A vehicle body-side battery 41, which will be described later, corresponds to the above-mentioned main battery 21.

The constructions of the above elements will be described in detail with reference to FIGS. 3 to 5.

In addition to the above elements, the vehicle body-side battery 41 of a known construction (serving as a power source), an ignition switch (IGN SW) 42 of a know construction, a courtesy switch (courtesy SW) 43 and switches 44 of a known construction are provided on the vehicle body 32. Although not particularly shown, the vehicle body-side control unit 35 is connected to the vehicle body-side battery 41 so that this battery can supply electric power to this vehicle body-side control unit 35. The ignition switch 42 is provided midway in a power supply line connecting the vehicle body-side battery 41 to the vehicle body-side control unit 35 and the feed control switch (SW) 36, so that the supply of electric power can be controlled by operating a switch (not shown). The courtesy switch 43 is provided in a predetermined position on an opening frame 45 for the slide door 33, and is operated when the slide door 33 is opened and closed. The courtesy switch 43 is connected to the vehicle body-side control unit 35. When the slide door 33 is opened, a courtesy lamp (not shown) is lighted. The vehicle body-side control unit 35 judges the (open/closed) condition of the slide door 33 from the operating condition of the courtesy switch 43 so as to control the feed control switch (SW) 36. The switches 44 include, for example, a centralized door lock switch, a power window switch and so on.

The primary coil unit 34 comprises at least a primary feed coil 46 (corresponding to a primary coil recited in the Claims), a primary coil oscillation drive control device 47, and a first feedback-purpose coil 48. The primary feed coil 46 corresponds to the above-mentioned primary feed-purpose non-contact connector. The first feedback-purpose coil 48 corresponds to the above-mentioned primary feedback-signal-purpose non-contact connector.

Figure 6:
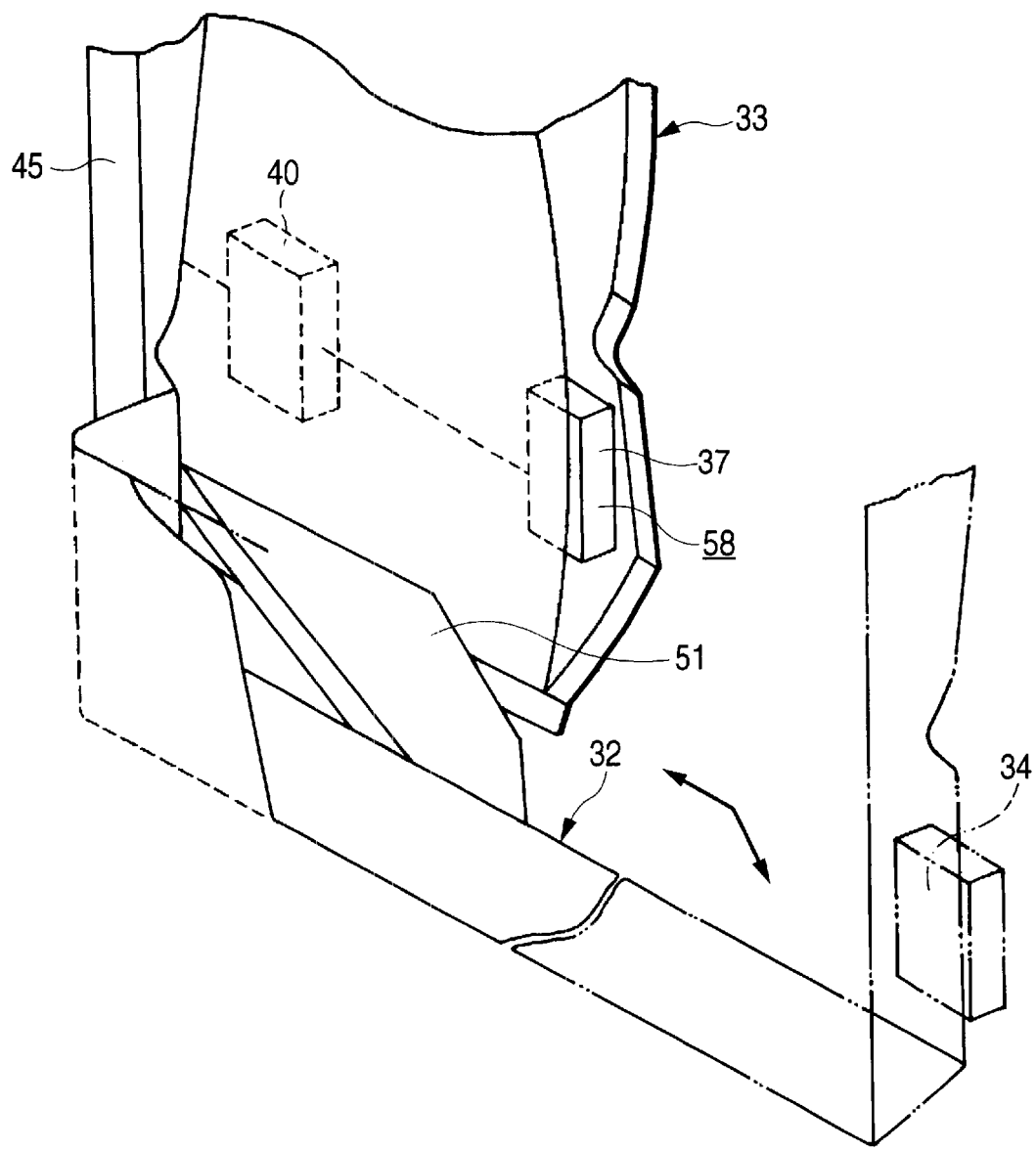
FIG. 6 is a perspective view explanatory of the arrangement of a primary coil unit and a secondary coil unit.
Figure 7:
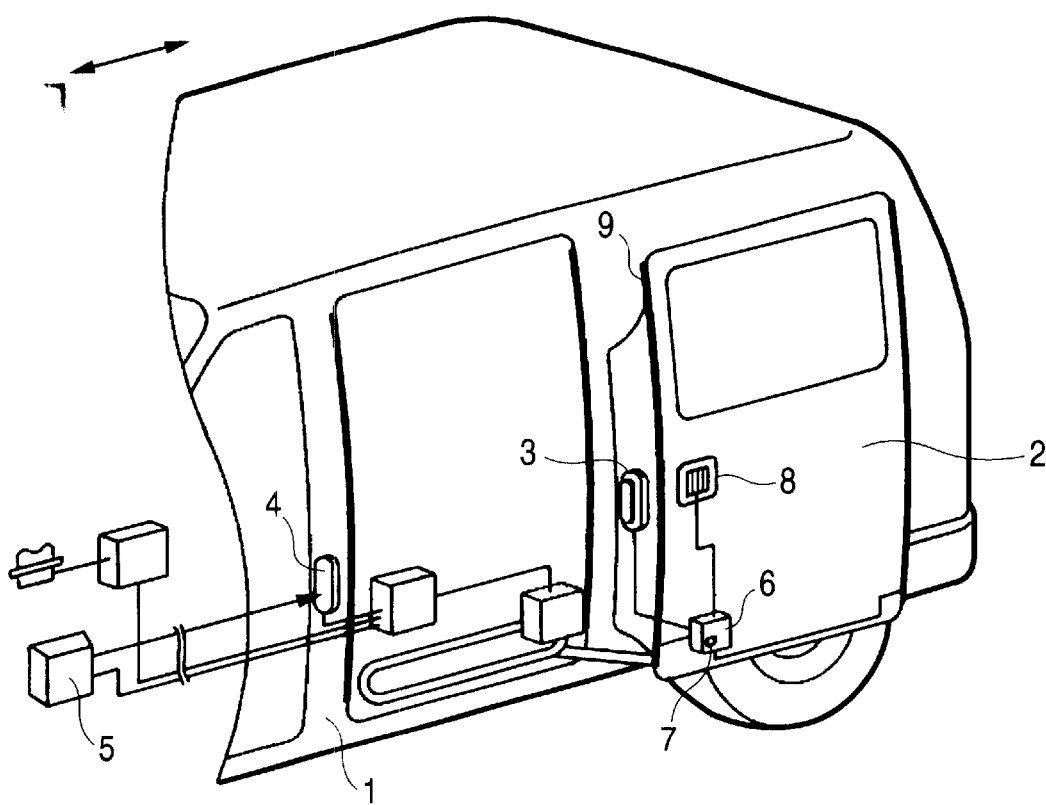
FIG. 7 is a schematic view showing a related vehicle slide door power supply apparatus.
Figure 8A:
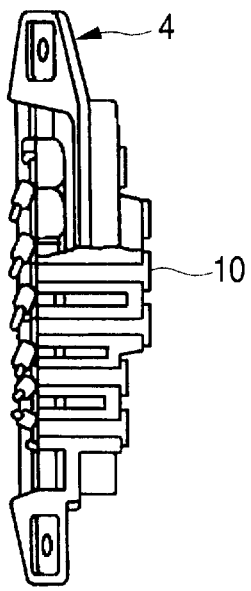
FIG. 8A is a schematic view showing a body-side feed contact.
Figure 8B:
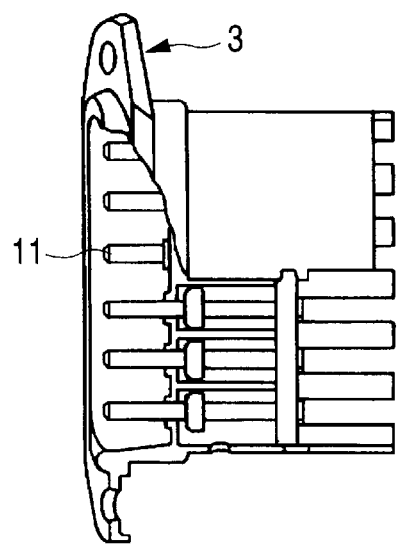
FIG. 8B is a schematic view showing a door-side feed contact.

The primary feed coil 46 has a known construction, and has a synthetic resin coating formed on its surface so that it can achieve a waterproof effect against water (such as water drops applied thereto from the exterior). A proximity fitting surface 49 of the primary feed coil 46 is exposed from the opening frame 45 (that is, exposed to that side wall of the opening frame 45 close to the front portion of the vehicle body 32; see FIG. 6) so that a secondary feed coil 55 (described later) can be disposed in close proximity to this fitting surface in opposed relation thereto (see FIG. 6).

The primary coil oscillation drive control device 47 is designed to control the oscillation drive of the primary feed coil 46. In other words, this device has the function of an inverter, and the function of switching the inverter, and is designed to control the excitation of the primary feed coil 46. The primary coil oscillation drive control device 47 has a microprocessor and so on (not shown). Further, the primary coil oscillation drive control device 47 inputs a feed back signal, fed from the first feedback-purpose coil 48, thereinto, and controls the oscillation drive of the primary feed coil 46 so as to stabilize the power source.

The first feedback-purpose coil 48 is connected to the primary coil oscillation drive control device 47 and the vehicle body-side control unit 35. The first feedback-purpose coil 48 functions in the same manner as the secondary feed coil 55 (described later) does, and has a synthetic resin coating formed on its surfaces so that it can achieve a waterproof effect against water (such as water drops applied thereto from the exterior). Further, the first feedback-purpose coil 48 is arranged and formed such that its proximity fitting surface (which is, for example, a common surface with respect to the proximity fitting surface 49) for a second feedback-purpose coil 57 is exposed from the opening frame 45.

The vehicle body-side control unit 35 controls, for example, various equipments and so on provided on the vehicle body 32, and comprises a microprocessor (not shown) and peripheral circuits thereof. The vehicle body-side control unit 35 has a radio transceiver 50 formed integrally therewith or separately therefrom. The feed control switch (SW) 36, the switches 44 and the first feedback-purpose coil 48 are connected to the vehicle body-side control unit 35. The vehicle body-side control unit 35 monitors a feedback signal (described later) sent from the slide door 33 side to the first feedback-purpose coil 48.

The above microprocessor includes a ROM, a CPU, an EEPROM, RAM, input/output ports and soon. The ROM is a read-only memory, and stores a program, fixed data and the like. The CPU is a central processing unit which operates in accordance with a control program be forehand stored in the above ROM. The EEPROM is an electrically erasable/programmable read-only memory, and various set value information and the like are stored therein. The above RAM is a free reading-writing memory, and has a data area for storing various data, used in the process of processing by the CPU, and a work area used in the processing.

The radio transceiver 50 is an equipment for transmitting and receiving control signals in a wireless manner relative to a radio transceiver 59 (described later) on the slide door 33. For example, when the driver operates a power window switch for a power window of the slide door 33, the radio transceiver 50 sends to the radio transceiver 59 the control signal to move a window pane of the slide door 33 upward or downward. In this embodiment, although the radio transceiver 50 transmits and receives the various control signals in a wireless manner, it may be so constructed as to transmit and receive these signals by wire or by electromagnetic induction (that is, by cables or by a mutual induction operation or the like as described later). The control signals can be transmitted and received by communication using light, infrared rays or the like.

The feed control switch (SW) 36 is the main relay as described above, and the ON/OFF of this switch is controlled by the vehicle body-side control unit 35. By turning on/off the feed control switch (SW) 36, the supply of electric power to the primary coil unit 34 is controlled.

A door stay 51 (see FIG. 6) is provided on a lower portion of the slide door 33. The secondary coil unit 37, the slide door-contained battery 38, the door-side control unit 39 and the charging switch (SW) 40 are provided on the slide door 33 as described above, and in addition door switches 52 and loads 53 are provided on this slide door.

The door stay 51 can be guided by a rail portion 54 provided at a lower portion of the opening frame 45 of the vehicle body 32. Namely, a roller (not shown) is provided at a distal end of the door stay 51, and this roller can roll along the rail portion 54. The door stay 51 is movable, together with the slide door 33, in the forward-rearward direction (see arrows in FIG. 6) of the vehicle body 32. In the case where the above-mentioned various control signals are transmitted and received by cables, the door stay 51 can be used as support means for the cables.

The secondary coil unit 37 comprises at least the secondary feed coil 55 (corresponding to a secondary coil recited in the Claims), a rectification charging function circuit 56, and the second feedback-purpose coil 57.

The secondary feed coil 55 has a known construction, and has a synthetic resin coating formed on its surface so that it can achieve a waterproof effect against water (such as water drops applied thereto from the exterior). A proximity fitting surface 58 of the secondary feed coil 55 is exposed from the opening frame 45 (that is, exposed to that side wall of the opening frame 45 close to the rear portion of the vehicle body 32; see FIG. 6) so that the proximity fitting surface 49 of the primary feed coil 46 can be disposed in close proximity to this fitting surface 58 in opposed relation thereto (see FIG. 6).

The rectification charging function circuit 56 comprises a rectifier circuit for rectifying a dielectric electromotive force, produced in the secondary feed coil 55, and a charging circuit for charging the slide door-contained battery 38 with the dielectric electromotive force produced in the secondary feed coil 55.

The second feedback-purpose coil 57 is connected to the rectification charging function circuit 56 and the door-side control unit 39. The second feed back-purpose coil 57 functions in the same manner as the primary feed coil 46 does, and has a synthetic resin coating formed on its surface so that it can achieve a waterproof effect against water (such as water drops applied thereto from the exterior). Further, the second feedback-purpose coil 57 is arranged and formed such that its proximity fitting surface (which is, for example, a common surface with respect to the proximity fitting surface 58) for the first feedback-purpose coil 48 is exposed from the opening frame 45. The second feedback-purpose coil 57 and the first feedback-purpose coil 48 are provided for stabilizing the power source.

The slide door-contained battery 38 is a power source of a known construction, and is connected to the door-side control unit 39 and the charging switch (SW) 40. Namely, the charging of the slide door-contained battery 38 is controlled by turning on/off the charging switch (SW) 40. The slide door-contained battery 38 can supply electric power to the door-side control unit 39 (It can always supply electric power though depending on the capacity. In the case where the slide door-contained battery 38 does not supply electric power in the closed condition of the slide door 33, a dielectric electromotive force, which can drive the loads 53, need to be produced in the secondary coil unit 37, and therefore there is a fear that the secondary coil unit 37 becomes large in size.). The slide door-contained battery 38 does not need to have a large capacity as in the vehicle body-side battery 41, and has a compact size and a capacity which can drive the loads 53. The slide door-contained battery 38 is mounted on the slide door 33 in an exchangeable manner.

The door-side control unit 39 drives and controls various loads 53 and so on provided on the slide door 33, and comprises a microprocessor (not shown) and peripheral circuits thereof. The door-side control unit 39 is designed to monitor the charged condition (charging rate) of the slide door-contained battery 38. The door-side control unit 39 is designed to control the ON/OFF of the charging switch (SW) 40. The door-side control unit 39 has the radio transceiver 59 formed integrally therewith (or separately therefrom). The radio transceiver 59 is an equipment for transmitting and receiving the control signals (for the loads 53 and so on) relative to the radio transceiver 50.

The charging switch (SW) 40 is controlled by the door-side control unit 39, and the charging of the slide door-contained battery 38 is controlled by turning on/off this switch.

The door switches 52 include, for example, a door opening/closing handle switch and a power window switch.

The loads 53 include, for example, a power window and a door lock.

The primary coil unit 34 can be formed as one module. Similarly, the secondary coil unit 37 can be formed as one module (in which the door-side control unit 39 and soon may be included) With this construction, the efficiency of the assembling operation is enhanced. It will be appreciated from the above construction that there is no bridge member for cables (cables for feeding purposes and cables for the control signals) between the vehicle body 32 and the slide door 33. Therefore, the efficiency of the assembling operation is enhanced.

Next, the operation of the vehicle slide door power supply apparatus of the above construction (as well as the charging method) will be described.

The operation of the vehicle slide door power supply apparatus of the above construction will be described with reference to an example different from the operation described above with reference to FIGS. 1 and 2.

When a key (not shown) is withdrawn from the ignition switch 42, electric power is not supplied from the vehicle body-side battery 41 to the vehicle body-side control unit 35 so that the supply of electric power to the slide door 33 is interrupted. Although electric power is supplied from the slide door-contained battery 38 to the door-side control unit 39, this control unit 39 will not operate before it receives the control signals from the vehicle body-side control unit 35. Therefore, even when the door switches 52 are operated, the door-side control unit 39 will not drive the loads 53.

When the key (not shown) is inserted into the ignition switch 42, and is operated, electric power is supplied from the vehicle body-side battery 41 to the vehicle body-side control unit 35. When electric power is supplied to the vehicle body-side control unit 35, this control unit 35 is driven, and sends the control signals to the door-side control unit 39 via the radio transceivers 50 and 59, thereby turning the door-side control unit 39 into a stand-by condition. The vehicle body-side control unit 35 confirms the ON/OFF condition of the courtesy switch 43, and judges whether or not the slide door 33 is closed. If the slide door 33 is closed, the feed control switch (SW) 36 is turned on, so that electric power can be supplied to the primary coil oscillation drive control device 47.

When the primary coil oscillation drive control device 47 is driven by the vehicle body-side control unit 35 and the feed control switch (SW) 36, the primary feed coil 46 is excited by the primary coil oscillation drive control device 47. When the primary feed coil 46 is excited, magnetic flux 60, produced by this excitation, penetrates through the secondary feed coil 55, disposed in close proximity to the primary feed coil 46 in the closed condition of the slide door 33, so that the secondary feed coil 55 produces an electromotive force by a mutual induction operation. Then, the electromotive force, produced in the secondary feed coil 55, is transmitted to the slide door-contained battery 38 through the rectification charging function circuit 56 and the charging switch (SW) 40, so that this battery is charged with this electromotive force (In this case, the loads 53 are in a stopped condition). At this time, in order to stabilize the power source, the feedback signal for voltage-adjusting purposes is sent by the mutual induction operation of the second feedback-purpose coil 57 and the first feedback-purpose coil 48 (Reference numeral 61 denotes magnetic flux).

On the other hand, the door-side control unit 39, supplied with electric power, controls the slide door-contained battery 38 and the plurality of loads 53 in the slide door 33. Then, when the charging rate of the slide door-contained battery 38, which has been kept monitored, exceeds the predetermined value, this control unit outputs a feed stop request to the second feedback-purpose coil 57. The feedback signal, representative of this feed stop request, is transmitted from the second feedback-purpose coil 57 to the first feedback-purpose coil 48.

The vehicle body-side control unit 35, which has been monitoring the feedback signal, inputs this feedback signal thereinto as a feed stop signal. When there is the feed stop request, this control unit turns off the feed control switch (SW) 36, thereby stopping the supply of electric power to the primary coil unit 34. When the supply of electric power to the primary coil unit 34 is interrupted, the vehicle body-side control unit 35 effects the trickle charging (trickle charge, pulse charge) corresponding to the self-discharge and dark current of the slide door-contained battery 38. This operation is not influenced whether or not there is the feed stop request. When there is no feed stop request, the supply of electric power is continued. When the vehicle body conditions (the engine is in the operating condition, and the slide door 33 is in the closed condition) are changed to be established, the trickle charging (trickle charge, pulse charge) is effected. At this time, if it is judged by the door-side control unit 39 that the charging rate of the slide door-contained battery 38 is above the predetermined value, the trickling operation is effected, and if not, the ordinary charging is effected. This is the same even after the loads 53 are operated.

As described above, it will be readily appreciated that the charging of the slide door-contained battery 38 can be effected efficiently. It will also be readily appreciated that the burden on the vehicle body-side battery 41 is reduced. Therefore, there is achieved an advantage that there is provided the charging method which overcomes the problems of the related art. In the present invention, various modifications can be made within the scope of the subject matter of the invention. Namely, the supply of electric power from the vehicle body 32 to the slide door 33 does not always need to depend on the above-mentioned mutual induction operation. The power supply through the body-side feed contact 4 and the door-side feed contact 5 as in the conventional construction, as well as the power supply through feed cables mounted on the slide door 33, may be adopted.

As described above, in the present invention, when the load in the slide door is in a stopped condition, and the charging rate of the slide door-contained battery is below the predetermined value, the slide door-contained battery is charged with the electric power. Therefore, the efficient charging of the slide door-contained battery can be effected. And besides, with this charging method, the burden on the vehicle body-side battery can be reduced. Therefore, there is achieved an advantage that there can be provided the slide door-contained battery-charging method in which the efficient charging is effected, and the burden on the vehicle body-side battery is reduced.

Further, the trickle charging is effected when the charging rate of the slide door-contained battery is above the predetermined value, and therefore there is achieved an advantage that the more efficient charging can be effected.

Further, there is achieved an advantage that the more efficient charging can be effected by utilizing the mutual induction operation. And besides, there is achieved an advantage that those portions, related to the power supply, can be made compact.

What is claimed is:

1. A method of charging a slide door-contained battery, mounted in a slide door slidable mounted to a vehicle body of a vehicle, with electric power supplied from the vehicle body to the slide door, the method comprising the step of:
   substantially continuously charging the slide door-contained battery with the electric power only when a load in said slide door is in a stopped condition and a charging rate of the slide door-contained battery is below a predetermined value.

2. The method according to claim 1 further comprising the step of trickle charging the slide door-contained battery when the charging rate of the slide door-contained battery is above the predetermined value.

3. The method according to claim 1, wherein the electric power is supplied from the vehicle body to the slide door by a mutual induction operation of a primary coil provided to the vehicle body and a secondary coil provided to the slide door.

4. A method of charging a slide door-contained battery, mounted in a slide door slidable mounted to a vehicle body of a vehicle, with electric power supplied from the vehicle body to the slide door, the method comprising the step of:
   charging the slide door-contained battery with the electric power when a load in said slide door is in a stopped condition and a charging rate of the slide door-contained battery is below a predetermined value; and
   trickle charging the slide door-contained battery when the charging rate of the slide door-contained battery is above the predetermined value.

5. A method of charging a slide door-contained battery, mounted in a slide door slidable mounted to a vehicle body of a vehicle, with electric power supplied from the vehicle body to the slide door, the method comprising the step of:
   charging the slide door-contained battery with the electric power when a load in said slide door is in a stopped condition and a charging rate of the slide door-contained battery is below a predetermined value, wherein the electric power is supplied from the vehicle body to the slide door by a mutual induction operation of a primary coil provided to the vehicle body and a secondary coil provided to the slide door.

* * * * *